Jan. 21, 1958     L. E. ALBERTSON     2,820,419
REGENERATING APPARATUS FOR WATER SOFTENERS
Filed Feb. 10, 1954     3 Sheets-Sheet 1

INVENTOR.
LAWRENCE E. ALBERTSON
BY
Braddock and Braddock
ATTORNEYS

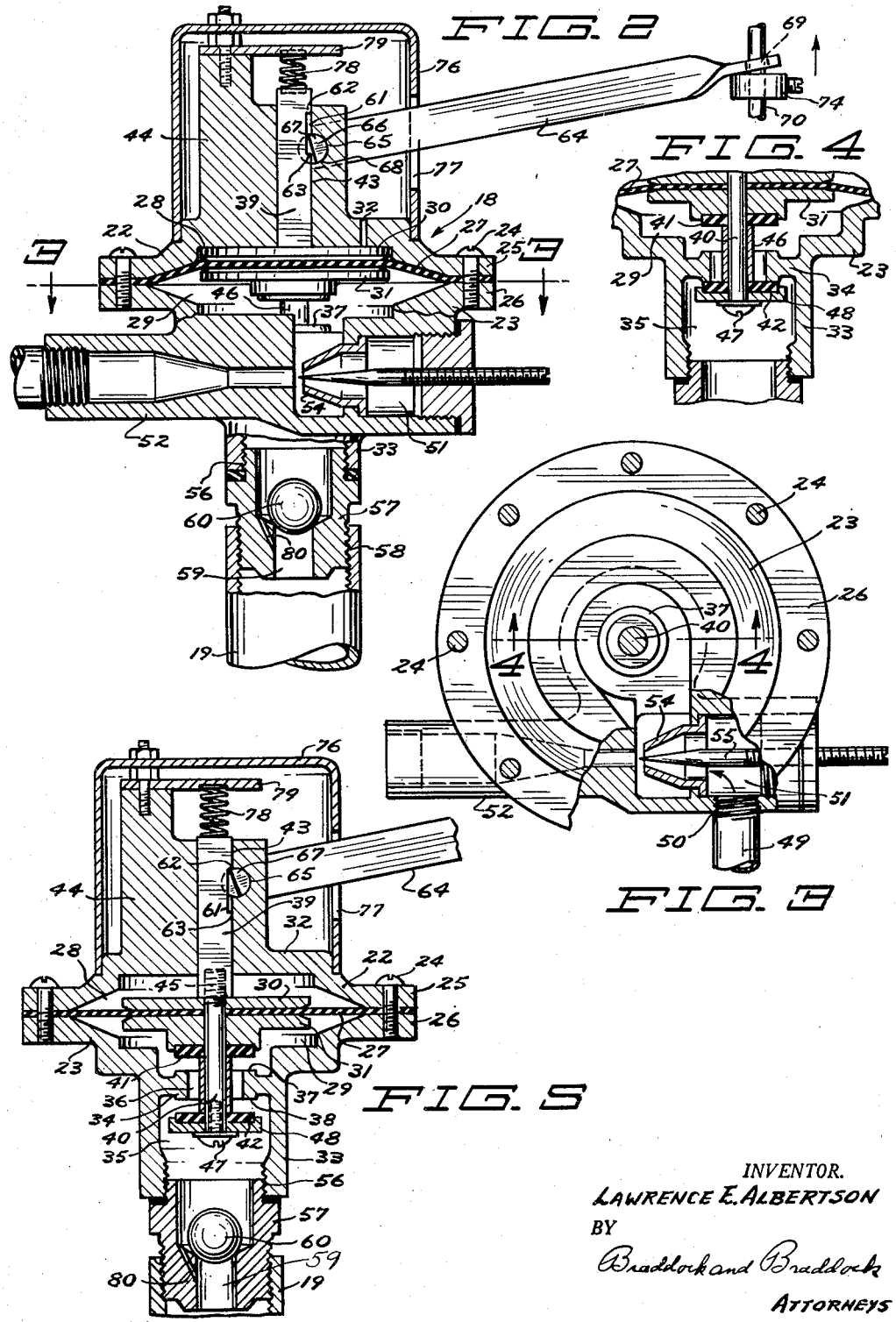

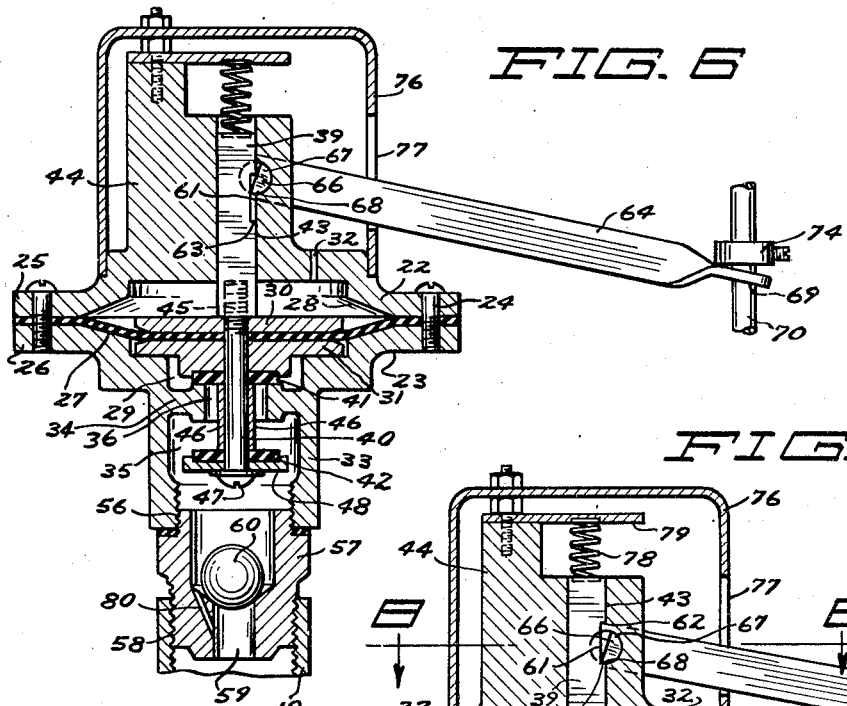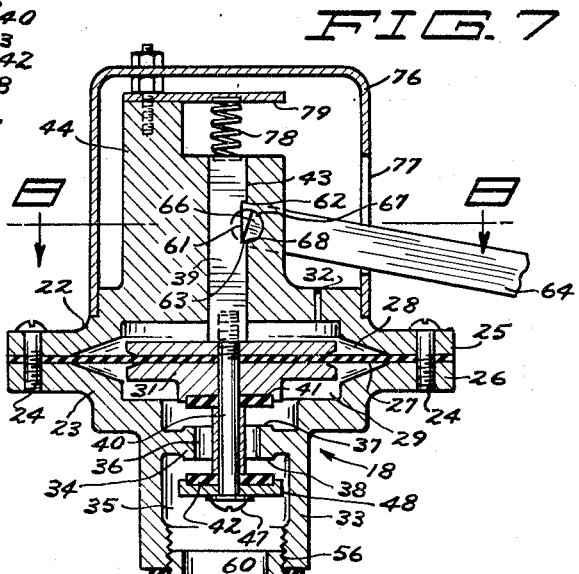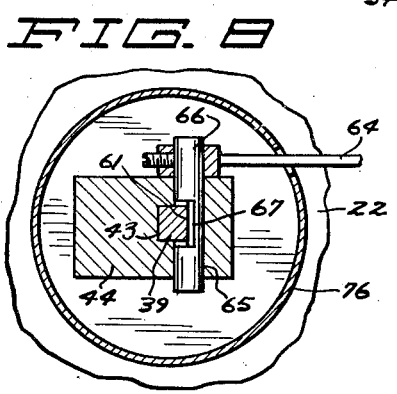

United States Patent Office 2,820,419
Patented Jan. 21, 1958

2,820,419

REGENERATING APPARATUS FOR WATER SOFTENERS

Lawrence E. Albertson, Minneapolis, Minn., assignor to The McKays Company, St. Paul, Minn., a corporation of Delaware Application February 10, 1954, Serial No. 409,304

5 Claims. (Cl. 103—276)

This invention has relation to an apparatus useful for the purpose of causing the zeolite bed of a zeolite water softener to be flushed with salt brine solution thus to become regenerated.

In operation, a zeolite water softener is regenerated, from time to time, upon becoming unfit to remove hardness from water. Regeneration involves the flushing of the zeolite bed of the water softener with a salt brine solution.

Brine solutions heretofore used in regenerating processes have been fed to zeolite beds of water softeners in several different ways. The present invention provides an apparatus incorporating a new and improved construction and arrangement for feeding salt brine solution to the zeolite bed of a water softener and for washing the brine solution and traces thereof from the zeolite bed after regeneration has been accomplished.

In the accompanying drawings forming a part of this specification,

Fig. 2 is an enlarged vertical sectional view of a valve apparatus of the disclosure of Fig. 1;

Fig. 3 is a horizontal sectional view, taken as on line 3—3 in Fig. 2, with parts broken away;

Fig. 4 is a detail sectional view, taken as on line 4—4 in Fig. 3;

Figs. 5, 6 and 7 are views corresponding generally with the disclosure of Fig. 2, but each showing parts in different positions; and Fig. 8 is a detail sectional view, taken as on line 8—8 in Fig. 7.

Figure 1:
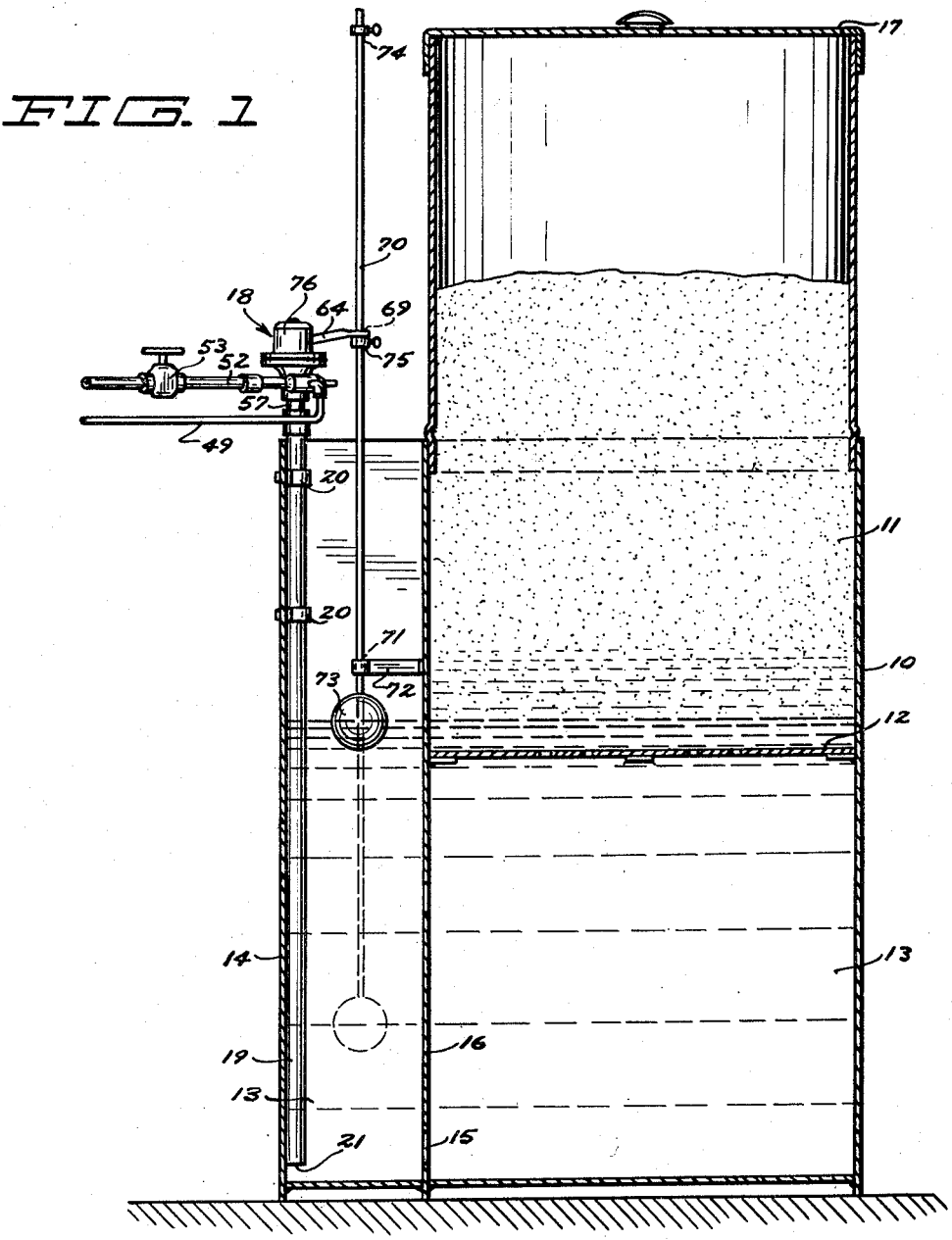
Fig. 1 is a vertical sectional view, partially in elevation, of a regenerating apparatus for water softeners made according to the invention.

The apparatus includes a tank for brine solution and salt, and a valve structure providing a hollow member. A diaphragm extends across the hollow member and provides therewith a chamber at one surface of the diaphragm. The opposite surface of the diaphragm is open to atmosphere. A tubular element adjacent the chamber extends outwardly from the hollow member and provides a concavity. A separating wall provided by the hollow member and situated between the chamber and concavity has a port therethrough which is bounded at its opposite ends by first and second continuous valve seats in the chamber and concavity, respectively. A valve stem of a double acting valve rigid with the diaphragm extends through the chamber and into the concavity, and first and second valves upon the valve stem are situated in the chamber and the concavity, respectively. The diaphragm is flexible in response to increase in pressure above atmospheric pressure in the chamber to cause the first valve to be opened and the second valve to be closed and in response to decrease in pressure in the chamber below atmospheric perssure to cause the second valve to be closed and the first valve to be opened. A conveying pipe extends between the concavity and brine solution in the tank. There is a valve member in the tubular element which permits flow from the conveying pipe to the concavity and precludes flow from the concavity to the conveying pipe. A by-pass for flow of water from the concavity to the conveying pipe has capacity for flow less than the capacity for flow of brine solution from the conveying pipe past the valve member to the concavity. An intake pipe for flow of water under pressure greater than atmospheric pressure leads into and an outlet pipe for flow of water and brine solution leads out of the chamber. Means is provided for selectively shutting off and establishing flow through the outlet pipe. Pressure of water from the intake pipe is operative when the outlet pipe is closed to create pressure above atmospheric pressure in the chamber and cause flow of water from the chamber, by way of the by-pass and the conveying pipe, into the tank up to a predetermined high level. An ejector between the intake pipe and the chamber is responsive to flow of water under pressure from the intake pipe to the outlet pipe when open to create pressure below atmospheric pressure within the chamber to cause flow of brine solution from the tank, by way of the conveying pipe, past the valve member and through the chamber, to the outlet pipe, thus to lower the elevation of brine solution in the tank to a predetermined low level. Pressure above atmospheric pressure within the chamber when the outlet pipe is closed also is operative to open the first valve and close the second valve and retain said first and second valves, respectively, in open and closed positions. Pressure below atmospheric pressure within the chamber when the outlet pipe is open also is operative to close the first valve and open the second valve and retain said first and second valves, respectively, in closed an open positions. A latch element arrests downward flexing of the diaphragm in the disclosure as made when situated at an intermediate position each time when moved between its uppermost and lowermost positions and upward flexing of the diaphragm when situated at an intermediate position each time when moved between its lowermost and uppermost positions thus to retain the first and second valves in open position both while brine solution is being caused to flow from said tank into the outlet pipe and water is being made to flow from the chamber into the tank. Lowering of the level of brine solution in the tank to the before mentioned predetermined low level and raising of the level of water and brine solution in the tank to the before mentioned predetermined high level causes the diaphragm to be released from the latch element. The first valve is retained open and the second valve is retained closed, as in Figs. 1, 2 and 4, during the operating cycle. The first and second valves are held open, as in Fig. 5, while brine solution is being made to flow from the tank to the outlet pipe. The first valve is retained closed and the second valve is retained open, as in Fig. 6, when rinse water is being made to flow from the intake pipe to the outlet pipe. And the first and second valves are held open, as in Fig. 7, while brine solution in the tank is being replenished. In Figs. 1, 2 and 4, the parts are situated as when the outlet pipe is closed and the water softener system is operative. In Fig. 5, the outlet pipe has been opened and the diaphragm has been arrested as when brine solution is being made to flow from the tank into the outlet pipe. In Fig. 6, the outlet pipe is open and the parts are situated as when rinse water is being made to flow from the intake pipe into the outlet pipe. In Fig. 7, the outlet pipe has been closed and the diaphragm has been arrested as when water is being made to flow from the intake pipe into the tank to replenish brine solution. Upon replenishment of brine solution, the latch element releases the valve member and diaphragm, and pressure within the chamber moves said valve member and diaphragm to their positions as in Figs. 1, 2 and 4.

With respect to the drawings and the numerals of reference thereon, 10 denotes a first upright tank unit for containing salt 11 in an upper portion thereof, resting upon a perforated floor 12 of said first tank unit, and salt brine solution 13 in a lower portion thereof, below said perforated floor. A removable cover for the first upright tank unit 10 is represented 17. A second upright tank unit 14 is at a side of the first upright tank unit 10 in contiguous relation thereto, and said first and second upright tank units are in communicating relation through the medium of an opening 15 in a lower portion of an upright wall 16 common to both the first and second upright tank units 10 and 14. Together, said upright tank units provide a tank for salt and salt brine solution.

The upper end of the second upright tank unit 14 is situated at elevation considerably above the perforated floor 12, as well as below the removable cover 17, and a valve apparatus, indicated generally at 18, is fixedly supported upon said second upright tank unit, above its upper end, through the instrumentality of a vertical conveying pipe 19 itself rigidly supported, as at 20, within the second upright tank unit against a wall thereof. The open, lower end 21 of the vertical conveying pipe 19 terminates in a lower portion of said second upright tank unit.

The valve apparatus 18 includes a casing consisting of a pair of oppositely disposed, hollow sections, denoted 22 and 23, respectively, connected to each other by screw bolts 24 in annular flanges, represented 25 and 26, respectively, integral with said hollow sections, and a diaphragm 27 extending across the casing in spaced relation to the hollow sections has its peripheral portions situated in and clamped in fluid-tight fashion between said annular flanges. The annular flanges 25 and 26 are in parallel relation, and the screw bolts 24 which pass through said annular flanges also pass through the diaphragm 27. Said diaphragm provides, together with the hollow sections 22 and 23, first and second chambers, indicated 28 and 29, respectively, at the opposite sides of the diaphragm. The second chamber 29 is also known as the diaphragm chamber.

As disclosed, the diaphragm 27 is protected by first and second discs, designated 30 and 31, respectively, secured against central portions of the upper and lower surfaces of said diaphragm. The disc 30 is within the first chamber 28 and the disc 31 is within the second chamber 29.

An opening 32 in the upper hollow section 22 permits passage of atmospheric air into and out of the first chamber 28.

The lower hollow section 23 includes a downwardly extending tubular element 33 integral therewith, and a horizontal wall or ring 34 within said tubular element. Said horizontal wall separates the second chamber 29 from a concavity or brine chamber 35 provided by said tubular element. A vertical port 36 through the horizontal wall 34 is bounded at its upper end by a first annular valve seat 37 and at its lower end by a second annular valve seat 38. Said first and second annular valve seats 37 and 38 are horizontally disposed, as well as situated in vertical alinement with central portions of the discs 30 and 31.

A double acting valve member includes a valve stem, constituted as an upper bar or plunger 39 and a lower rod 40, and upper and lower horizontal valves or valve wafers, indicated 41 and 42, respectively, upon said lower rod. The upper bar 39, rectangular in cross-section as disclosed, is snugly slidable in a vertical rectilinear opening 43 in an upwardly extending body member 44 integral with the upper hollow section 22. The lower rod 40 is situated centrally in and extends downwardly from the discs 30, 31 and the vertical port 36. The upper end of said lower rod is threadably received, as at 45, in the lower end of the upper bar 39. Said upper bar and lower rod are in vertical alinement. The upper valve 41 is situated within the second chamber 29, beneath the disc 31, and the lower valve 42 is situated within the concavity 35. A tubular piece 46 upon the lower rod 40 retains the upper and lower horizontal valves 41 and 42 in spaced relation. A head 47 upon the lower end of the rod 40 is engaged by a disc member 48, also upon the rod, itself engaged by the lower valve 42. The construction and arrangement will be such that when the lower rod 40 is threaded into the upper bar 39, as in the drawings, the disc 30 will be clamped between the lower end of the bar 39 and the diaphragm 27, the disc 31 will be clamped between said diaphragm and the upper valve 41, said upper valve will be clamped between said disc 31 and the tubular piece 46, said tubular piece will be clamped between the upper valve and the lower valve, said lower valve will be clamped between the tubular piece 46 and the disc member 48, and said disc member will be clamped between said tubular piece and the head 47 upon the lower rod 40. The construction and arrangement also will be such that the upper valve 41 can become engaged against the first annular valve seat 37, as in Fig. 6, in response to downward flexing of the diaphragm 27 and the lower valve 42 can become engaged against the second annular valve seat 38, as in Figs. 2 and 4, in response to upward flexing of said diaphragm. When either the upper or the lower valve is engaged against the corresponding valve seat, communication between the second chamber 29 and the concavity 35 will be shut off. When both the upper and lower valves are in spaced relation to their respective valve seats, as in Figs. 5 and 7, there can be passage of fluid in either direction past the vertical port 36.

An intake or raw water supply pipe 49 for water from a source (not shown) under pressure leads, as at 50, into a nozzle compartment 51 at a side of a lower portion of and communicated with by said second chamber 29, and an outlet pipe 52 leads from said compartment to a zeolite bed (not shown) of a water softener. A manually operable valve for controlling flow through the outlet pipe 52 is denoted 53. As shown, the intake pipe 49 and the outlet pipe 52 are at 90 degrees apart and in the same horizontal plane.

A venturi 54 in the compartment 51 is in alinement with and adjacent relation to the outlet pipe 52. The venturi consists of a nozzle and a discharge pipe. An adjustable needle valve 55 in said venturi provides therewith what is commonly known as an ejector.

The lower end of the downwardly extending tubular element 33 fixedly supports, as at 56, a hollow fitting 57 which in turn is supported, as at 58, in the upper end of the vertical pipe 19. Upward flow from said conveying pipe 19 to the concavity 35 is by way of a port or check valve seat 59 through the hollow fitting 57 controlled by an upwardly opening ball check valve 60 which precludes downward flow from the concavity to the conveying pipe save through a small aperture 80 in the hollow fitting and by-passing said port 59.

The rectilinear upper bar 39 of the valve stem has a longitudinally extending rectilinear slot or notch 61 in an upper portion of a wall thereof providing a downwardly facing, horizontal shoulder 62 bounding an upper end of said rectilinear slot and an upwardly facing, horizontal shoulder 63 bounding a lower end of the rectilinear slot.

A control lever or arm 64 rigidly supports a latch element 66 itself rotatably mounted, as at 65, in the upwardly extending body member 44. Said latch element includes an upper keeper 67 selectively to be situated in the rectilinear slot 61 and engaged by the downwardly facing, horizontal shoulder 62, as in Fig. 5, and a lower keeper 68 selectively to be situated in said rectilinear slot and engaged by the upwardly facing, horizontal shoulder 63, as in Fig. 7.

An outer end of the control lever 64 has a vertical guide opening 69 therethrough for snugly slidably receiving a vertical actuator stick 70. Said actuator stick also passes snugly through a vertical guide opening 71 in an arm 72 projecting from a wall of the first upright tank unit 10. The lower end of the actuator stick 70 is rigidly connected to a float 73 which rests upon salt brine solution in the tank 10, 14. Spaced upper and lower collars, denoted 74 and 75, respectively, rigid with the actuator sitck 70, are for actuating the control lever in response to longitudinal movement of said actuator stick, upwardly or downwardly, as the case may be. That is to say, the upper collar 74 is adapted to actuate the control lever 64 downwardly in response to downward movement of the actuator stick 70 to release the upper keeper 67 from the upper horizontal shoulder 62 and thus permit the diaphragm 27 and the upper and lower valves 41 and 42 to be moved from their position as in Fig. 5 to their position as in Fig. 6, and the lower collar 75 is adapted to actuate said control lever upwardly in response to upward movement of said actuator stick to release the lower keeper 68 from the lower horizontal shoulder 63 and thus permit said diaphragm and upper and lower valves to be moved from their position as in Fig. 7 to their position as in Fig. 4.

A covering cap for the upwardly extending body member 44 is indicated 76, and a vertical slot 77 in said covering cap is for passage of the control lever 64.

A compression coil spring 78, between a plate 79 rigid with the body member 44 and the upper end of the upper bar 39 of the valve stem, is for insuring that said valve stem will be retained in an intermediate position for said upper bar, with the upper and lower horizontal shoulders 62 and 63 in proper and intended relation to the upper and lower keepers 67 and 68, when the regenerating apparatus is originally installed, of course while atmospheric pressure prevails in both the first and the second chambers 28 and 29. The compression coil spring 78 serves no useful purpose during practical operation of the regenerating apparatus.

In Figs. 1 and 2 of the drawings, the control lever 64 is disclosed as when at its uppermost position, having been actuated to such position by reason of elevation of the lower collar 75, together with the float 73 and the vertical actuator stick 70 as a unit, in response to elevation of fluid in the tank 10, 14. In Fig. 2, the upper keeper 67 is within the rectilinear slot 61 in equally spaced relation to the upper and lower horizontal shoulders 62 and 63. Also in Fig. 2, as well as in Fig. 4, the diaphragm 27 is disclosed as when at its uppermost flexed position, the upper valve 41 is disclosed as when wide open and the lower valve 42 is disclosed as when completely closed. Said control lever, with its upper and lower keepers, and said diaphragm, with its associated parts, are disclosed in said Figs. 1, 2 and 4 in the position in which they are situated when the manually actuable valve 53 is closed, a water softener having a zeolite bed to be regenerated is operative between regenerating cycles, pressure exists in the intake pipe 49 and salt brine solution is existent in the upright tank 10, 14 up to the highest possible level, which as shown is somewhat above the perforated floor 12 upon which salt 11 is supported.

When regeneration is to be accomplished, the manually operable valve 53 will be opened. Immediately, there will be flow of water under pressure from the intake pipe 49, through the compartment 51 and past the ejector to the outlet pipe 52, and thence through the zeolite bed to drain. Such force flow of water past the ejector will cause pressure less than atmospheric pressure to exist within the second chamber 29 and said compartment 51. Thus atmospheric air will pass into the first chamber 28, by way of the opening 32, and force the diaphragm 27 to be flexed downwardly from its position as disclosed in Figs. 1, 2 and 4 toward its position as disclosed in Fig. 6. Stated differently, the diaphragm 27 will be flexed downwardly in response to differential in pressure existent within the first and second chambers 28 and 29 by reason of forced flow of water out of said second chamber 29 and the compartment 51 past the ejector to the outlet pipe 52. With downward flexing of the diaphragm 27, the lower valve 42 will be moved to open position and the upper valve 41 will be moved toward closed position. As will be evident from Fig. 2 of the drawings, the upper keeper 67 is in the path of downward movement of the upper horizontal shoulder 62 upon commencement of a regenerating cycle. The construction and arrangement will be such that downward flexing of the diaphragm 27 will be arrested by engagement of said upper horizontal shoulder 62 with said upper keeper 67 immediately after pressure within the second chamber 29 becomes less than atmospheric pressure, thus to retain both the upper and lower valves 41 and 42 in open position, as in Fig. 5. Concurrently with opening of the lower valve 42, atmospheric pressure will cause salt brine solution to be forced upwardly from the tank 10, 14, through the conveyor pipe 19, into the compartment 51, and salt brine solution which enters said compartment will be ejected together with water under pressure, out of the second chamber 29 and into the outlet pipe 52. Stated differently, salt brine solution will be forced from the upright tank 10, 14 through the conveyor pipe 19, into the compartment 51 in response to differential in pressure existent within said upright tank and the second chamber 29.

The float 73, with the vertical actuator stick 70 and the upper and lower collars 74 and 75 as a unit, will become depressed by gravity as the level of salt brine solution in the upright tank 10, 14 lowers. Eventually, when a predetermined amount of salt brine solution has been fed to the zeolite bed and a corresponding low level of salt brine solution in the upright tank 10, 14 has been reached, the upper collar 74 will actuate the control lever 64 downwardly thus to move the upper keeper 67 outwardly of the upper bar 39, from beneath the upper horizontal shoulder 62. Immediately thereafter the diaphragm 27 and the parts associated therewith will be moved from position as in Fig. 5 to position as in Fig. 6, where the lower valve 42 is disclosed in wide open position and the upper valve 41 is disclosed in closed position. Closing of said upper valve 41 will preclude passage of salt brine solution from the upright tank 10, 14 through the conveying pipe 19, but flow of water, for washing brine solution and traces thereof from the zeolite bed, will continue as long as the manually operable valve 53 is permitted to remain open.

In Fig. 6 of the drawings, the control lever 64 is disclosed as when at its lowermost position, having been actuated to such position by reason of depression of the upper collar 74, together with the float 73 and the vertical actuator stick 70 as a unit, in response to depression of fluid in the upright tank 10, 14. In said Fig. 6, the lower keeper 68 is within the rectilinear slot 61 in equally spaced relation to the lower and upper horizontal shoulders 63 and 62. Also in Fig. 6, the diaphragm 27 is disclosed as when at its lowermost flexed position, the lower valve 42 is disclosed as when wide open and the upper valve 41 is disclosed as when completely closed. The control lever, lower and upper keepers and the diaphragm, with its associated parts, are disclosed in said Fig. 6 in the position in which they are situated when washing of brine solution out of a zeolite bed is being accomplished, the manually operable valve being open and the level of brine solution in the upright tank 10, 14 being at its lowest.

When washing of a zeolite bed is to be discontinued, the manually operable valve 53 will be closed. Immediately, flow of water through the outlet pipe 52 will be interrupted and pressure greater than atmospheric pressure will be built up in the second chamber 29, by reason of continued flow of water under pressure from the intake pipe 49 into said second chamber. The greater than atmospheric pressure will cause the diaphragm 27 to be flexed upwardly from its position as disclosed in Fig. 6 toward its position as disclosed in Fig. 4. That is, the diaphragm 27 will be flexed upwardly in response to differential in pressure existent within the second and first chambers 29 and 28 by reason of forced flow of water into said second chamber, which will force flow of air out of said first chamber by way of the opening 32. With upward flexing of the diaphragm 27, the upper valve 41 will be moved to open position and the lower valve 42 will be moved toward closed position. As will be seen in Fig. 6, the lower keeper 68 is in the path of upward movement of the lower horizontal shoulder 63 upon completion of a regenerating cycle. The construction and arrangement will be such that upward flexing of the diaphragm 27 will be arrested by engagement of said lower horizontal shoulder 63 with said lower keeper 68 immediately after pressure within the second chamber 29 becomes greater than atmospheric pressure, thus to retain both the lower and upper valves 42 and 41 in open position, as in Fig. 7. Concurrently with opening of the upper valve 41, water under pressure will flow from the intake pipe 49, through the compartment 51, the second chamber 29, the concavity 35, the small aperture 80 and the vertical conveying pipe 19, into the upright tank 10, 14. That is, water under pressure greater than atmospheric pressure will be forced from the intake pipe 49 into said upright tank 10, 14.

The float 73, with the vertical actuator stick 70 and the lower and upper collars 75 and 74 as a unit, will be elevated as the level of water in the upright tank 10, 14 rises. Eventually, when a predetermined amount of water, to become brine solution, has been fed to said upright tank and a corresponding high level of fluid has been reached; say, for example, up to the fluid level as disclosed in Fig. 1 of the drawings; the lower collar 75 will actuate the control lever 64 upwardly thus to remove the lower keeper 68 outwardly of the upper bar 39, from above the lower horizontal shoulder 63. Immediately thereafter the diaphragm 27 and the parts associated therewith will be moved from position as in Fig. 7 to position as in Figs. 1, 2 and 4, where the upper valve 41 is disclosed in wide open position and the lower valve 42 is disclosed in closed position. Closing of said lower valve will preclude passage of water from the intake pipe 49 into the upright tank.

It will be apparent that the manually actuable valve 53 in the outlet pipe 52 could be replaced by a mechanically operable valve actuable, to open position when a regenerating cycle was to be commenced and to closed position when washing of a zeolite bed was to be discontinued, by a time controlled mechanism.

What is claimed is:

1. A control valve including a base having a diaphragm chamber, an intake chamber and a nozzle compartment, a wall between said diaphragm chamber and said intake chamber, said wall having an opening therethrough, a diaphragm in sealing relationship to said diaphragm chamber, said diaphragm being movable toward a first upper position in response to introduction of a pressure in said diaphragm chamber of greater than atmospheric and movable toward a second downward position in response to a pressure of less than atmospheric in said diaphragm chamber, a first valve mounted to move with said diaphragm to come into sealing relationship with said wall opening when said diaphragm is in its second downward position, a second valve mounted to move with said diaphragm to come into sealing relationship with said wall opening when said diaphragm is in its first upward position, a supply pipe open to said nozzle compartment, a venturi nozzle adapted to discharge from said nozzle compartment into said diaphragm chamber, a venturi discharge pipe in operating alinement with said nozzle in said discharge chamber and open to the outside of said base, an intake pipe open to said intake chamber, a control arm, means for causing said control arm to be selectively moved between upper and lower conditions, latch means operative to stop movement of said diaphragm toward said first upper position at a point where both valves are spaced from said wall opening when said control arm is in its upper condition and to permit further movement of said diaphragm toward said first upper position when said control arm is moved toward its lower condition, operative to stop movement of said diaphragm toward said second lower position at a point where both valves are spaced from said wall opening when said control arm is in its upper condition and to permit further movement of said diaphragm toward said second lower position when said control arm is moved toward its lower condition.

2. A regeneration control valve including a base casting having a diaphragm chamber and a brine chamber, an inwardly extending ring having a passageway therethrough open to both said diaphragm chamber and said brine chamber, said ring being provided with first and second valve seats each in surrounding relationship to an opposite side of said passageway, a diaphragm fixedly mounted on said base casting to be in covering, sealing relationship to said diaphragm chamber, first and second valve wafers mounted in spaced apart fixed relationship to each other to move with said diaphragm, said diaphragm movable toward an upward position in response to introduction of a pressure in said diaphragm chamber of greater than atmospheric and movable toward a downward position in response to the presence of a pressure of less than atmospheric in said diaphragm chamber, said first valve wafer being positioned to come into sealing relationship with said first valve seat when said diaphragm is in its downward position, said second valve wafer being positioned to come into sealing relationship with said second valve seat when said diaphragm is in its upward position, a nozzle compartment on said casting, a raw water supply pipe open to said nozzle compartment, a venturi nozzle adapted to discharge from said nozzle compartment into said diaphragm chamber, a venturi discharge pipe in operating alinement with said nozzle in said discharge chamber and open to the outside of said casting, a brine pipe open to said brine chamber, a control arm, means for causing said control arm to be selectively positioned in upper and lower conditions, latch means operative to stop upward movement of said diaphragm at a point where both valve wafers are spaced from both valve seats when said control arm is in its lower condition and to permit further upward movement when said control arm is moved toward its upper condition, operative to stop downward movement of said diaphragm at a point where both valve wafers are spaced from both valve seats when said control arm is in its upper condition and to permit further downward movement when said control arm is moved toward its lower condition.

3. A regeneration control valve including a base casting having a diaphragm chamber and a brine chamber, an inwardly extending ring having a passageway therethrough open to both said diaphragm chamber and said brine chamber, said ring being provided with first and second valve seats each in surrounding relationship to an opposite side of said passageway, a diaphragm fixedly mounted on said base casting to be in covering, sealing, relationship to said diaphragm chamber, first and second valve wafers mounted in spaced apart fixed relationship to each other to move with said diaphragm, said diaphragm movable toward an upward position in response to introduction of a pressure in said diaphragm chamber of greater than atmospheric and to move to a downward position in response to the presence of a pressure of less than atmospheric in said diaphragm chamber, said first valve wafer being positioned to come into sealing relationship with said first valve seat when said diaphragm is in its downward position, said second valve wafer being positioned to come into sealing relationship with said second valve seat when said diaphragm is in its upward position, a nozzle compartment on said casting, a raw water supply pipe open to said nozzle compartment, a venturi nozzle adapted to discharge from said nozzle compartment into said diaphragm chamber, a venturi discharge pipe in operating alinement with said nozzle in said discharge chamber open to the outside of said casting, a brine pipe open to said brine chamber, a plunger fixedly mounted with respect to said diaphragm to move therewith, said plunger being provided with a rectilinear notch along a first side thereof, a control arm pivotally mounted with respect to said casting, means for causing said control arm to be selectively positioned in upper and lower conditions, lower latch means associated with said control arm adapted to be situated in said rectilinear notch when said diaphragm is in its downward position and said control arm is in lower condition, adapted to contact a lower corner of said notch to stop upward movement of said diaphragm at a point where both valve wafers are spaced from both valve seats when said control arm is in its lower condition and to move to position clear of said rectilinear notch when said control arm is moved toward its upper condition, and upper latch means associated with said control arm adapted to be situated in said rectilinear notch when said control arm is in its upper condition and said diaphragm is in its upward position, adapted to contact an upper corner of said notch to stop downward movement of said diaphragm at a point where both valve wafers are spaced from both valve seats when said control arm is in its upper condition and to move to position clear of said rectilinear notch when said control arm is moved toward its lower condition.

4. The combination as specified in claim 3, a check valve seat situated between said brine chamber and said brine pipe, a check valve in said brine chamber in operational alinement with said check valve seat, and said check valve seat is provided with a by-pass opening from said brine chamber to said brine pipe.

5. The combination as specified in claim 3, and a needle valve adjustably mounted in said nozzle compartment to extend into said nozzle.

References Cited in the file of this patent

UNITED STATES PATENTS

| | | |
|---|---|---|
| 394,715 | Neu | Dec. 18, 1888 |
| 1,233,017 | Bartlett | July 10, 1917 |
| 1,393,217 | Haley | Oct. 11, 1921 |
| 1,685,816 | Kenney | Oct. 2, 1928 |
| 1,851,927 | McCord | Mar. 29, 1932 |
| 1,889,231 | Wahlbom et al. | Nov. 29, 1932 |
| 1,934,713 | Hughes | Nov. 14, 1933 |
| 2,352,630 | Griswold | July 4, 1944 |
| 2,556,872 | Deters | June 12, 1951 |
| 2,558,471 | Whitlock | June 26, 1951 |
| 2,636,560 | Rogers | Apr. 28, 1953 |
| 2,710,018 | Wolfe | June 7, 1955 |

FOREIGN PATENTS

| | | |
|---|---|---|
| 470,842 | Great Britain | Aug. 18, 1937 |